July 4, 1961 A. J. TAYLOR 2,991,413
BATTERY VOLTAGE STRENGTH INDICATOR
Filed March 19, 1956 2 Sheets-Sheet 1

*INVENTOR.*
ALEXANDER J. TAYLOR
BY *A. A. Orlinger*
ATTORNEY

July 4, 1961  A. J. TAYLOR  2,991,413
BATTERY VOLTAGE STRENGTH INDICATOR
Filed March 19, 1956  2 Sheets-Sheet 2

INVENTOR.
ALEXANDER J. TAYLOR
BY
*A. A. Orlinger*
ATTORNEY

United States Patent Office 2,991,413
Patented July 4, 1961

2,991,413
BATTERY VOLTAGE STRENGTH INDICATOR
Alexander J. Taylor, 7323 Bryan St., Philadelphia 19, Pa.
Filed Mar. 19, 1956, Ser. No. 572,267
16 Claims. (Cl. 324—29.5)

This invention is that of an electrically operated device for showing directly the general level of the voltage strength of a battery used to provide the spark for an internal combustion engine or to energize an electric motor, or for other use.

The device shows the strength of a battery at a glance to anyone who can read words like "high," "medium," and "low," or who can understand that a light in one position or of one color, such as green, means high, that a light in an intermediate position or of another color, say amber, means medium, and that a light in a further position or of a third color, e.g. red, means low.

Thus, the device of the invention is one that any individual, male or female, skilled or unskilled, who may be handling any machine or other combination that includes at least one battery, readily can use to tell directly and quickly whether or not any battery is about run down.

The ordinary motor vehicle or other automotive equipment, such as a bus, tractor, motor-boat, aeroplane, or any other propelled by internal combustion engine or battery driven motor most usually has no device that can indicate the voltage condition of a battery to the average person. This is a recognized disadvantage especially in the winter or after the equipment has been run for a considerable time with continued drain on the battery, for example, as with the starting of a cold engine of an automobile or after having its lights on or radio going for a long time with the motor only idling or off.

The usual hydrometer is useless when the battery is dry or the level of its acid is too low. So also is the battery acid level indicator limited, for example, to showing the acid level.

These various disadvantages are overcome by the device of the invention. Considered broadly, it includes two leads, conveniently called the positive conductor and negative conductor respectively, for connection with the terminals of a battery, and at least two relatively similar voltage strength indicating circuits in parallel connection with these conductors. These circuits excite then respectively the different indicia that show directly the general voltage strength of the battery. They are alike in their combination of elements. They differ only in an adjustment so that they respond to different strengths of electrical impulse.

Each voltage strength indicating circuit has two branches connected in parallel between the two main conductors, i.e. the positive and the negative conductors. One branch is the voltage strength indicating one. It has in electrical series connection primarily an electrically operable voltage range indicator and a closable switch that, when closed, allows current to flow through the branch, together with the necessary connecting conductors. In the presently preferred form the voltage range indicator is a small wattage, such as fractional, electric light bulb in a suitable socket. Any other suitable indicator can be used but the light bulb presently appears to be both the simplest and most advantageously effective.

The second branch of the strength indicating circuit serves to close the switch of the other branch. Thus, the second branch has means operable to close that switch when the voltage of the battery can propel through that branch enough current to provoke the operation of the switch closing mechanism.

Fundamentally, a minimum of two voltage range (or strength) indicating circuits are needed. One adjusted to respond when the voltage is in its low range, and the other that responds when the voltage is in the high part of its range. As will be seen below, it is preferable to have three range indicating circuits, with the third one being an intermediate one that responds when the voltage is in the middle of its range. More than three can be used, but are not generally necessary.

In a simple modification of the device of the invention, when the voltage is low, only the low indicator shows; and when the voltage is in the medium portion of the range, both the low and the medium indicators show; and when the voltage is high, all three indicators show.

Accordingly, another modification of the device of the invention includes electrically excited elements that operate to cause the low range voltage indicator circuit to be cut out when the battery voltage is in the medium part of its range, and which operate to cause both the low range and the medium range voltage indicator circuits to be cut out when the voltage is in the high part of its range.

Each of the various indicated modifications of the device can be put up either in portable form or in form mounted on a work bench or on an indicator board associated with the combination that includes one or more batteries to be tested, for example, with the manually operated switch and the indicator light bulbs mounted on the dashboard of an automobile or of a motor boat or motor launch.

For a motor boat or launch that uses more than one battery at a time, a further modification of the type having indicator lights and manually operated switch mounted on a dashboard includes a selector switch as the manually operated switch and with separate conductors running from each of the selectable contacts of the switch respectively separately to a different battery and a common return line from all of them in parallel to the selector arm.

The particular features of the invention are explained more fully in the following more detailed description given in relation to the illustrative embodiments, to which the invention is not to be restricted, shown in the accompanying drawings, in which.

Figure 1:
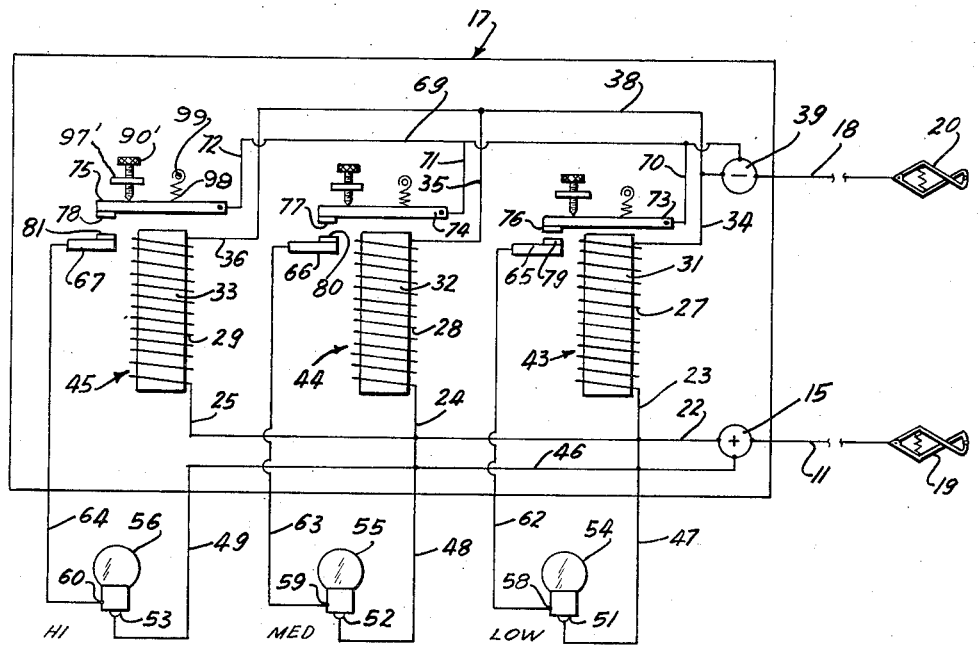
FIG. 1 shows a circuit of an embodiment having three voltage range strength indicator circuits including electric bulb indicators and positive and negative conductors terminating in clips for attachment to the terminals of a battery.
Figure 2:
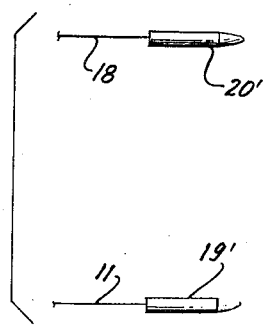
FIG. 2 shows a pair of contacts that can be used in place of the clips at the ends of the positive and negative conductors shown in FIG. 1.

As seen from FIGURES 1 and/or 4, positive conductor 11 extends from positive terminal 12 of a battery 13 through a push button switch 14 to input terminal 15 of the testing device, indicated as a whole as 17.

In the modification wherein the testing device of the invention is mounted on the machine, apparatus, piece of equipment or combination employing one or more batteries to provide ignition spark or energize an electric motor, the positive conductor 11 is fixedly connected to the positive terminal of the battery. For example, the outer extremity of the conductor can be caught between the clamping ring that is tightened about the battery terminal detachably permanently to fasten the ordinary battery cable to a battery. Alternatively, conductor 11 can be detachably permanently attached to the positive terminal of a battery. The negative conductor is similarly detachably permanently connected to the negative terminal of a battery.

On the other hand, in a portable modification of the testing device, the outer end of positive conductor 11 and of negative conductor 18 terminates with attaching clamps 19 and 20 respectively. These clamps are clamped temporarily to the corresponding poles of a battery in the same manner that the outer ends of the cables of a booster battery are attached to the terminals of an automobile battery.

Instead of clamps 19 and 20, conductors 11 and 18 can terminate respectively in hand-pressure pins 19' and 20'. These only need to be held firmly in contact with the corresponding terminals of a battery to obtain directly and quickly a reading of its voltage strength.

From input terminal 15, positive extension conductor 22 extends within the device and from it take-off leads 23, 24 and 25 connect respectively to the input end of coils 27, 28 and 29. These coils are wound respectively about magnetizable cores 31, 32 and 33. From the output end of these coils, return leads 34, 35 and 36 connect (in FIG. 1) with negative extension 38. That runs to negative terminal 39 which connects through negative conductor 18 with end clamp 20 to the negative terminal of the battery.

Correspondingly, the output end of each of coils 27, 28 and 29 runs (in FIG. 4) to ground connections 34', 35' and 36', from which negative conductor 18 (not shown in FIG. 4) connects with negative terminal 41 (shown in FIG. 4 as connected to ground 18') of battery 13.

Thus, take-off lead 22, coil 27, and return lead 34 constitute the switch operating branch of the low voltage indicating circuit. Correspondingly, take-off lead 24, coil 28, and return lead 35 constitute the switch operating branch of the medium range voltage indicating circuit; and take-off lead 25, coil 29 and return lead 36 constitute the switch operating branch of the high voltage indicating circuit.

Figure 4:
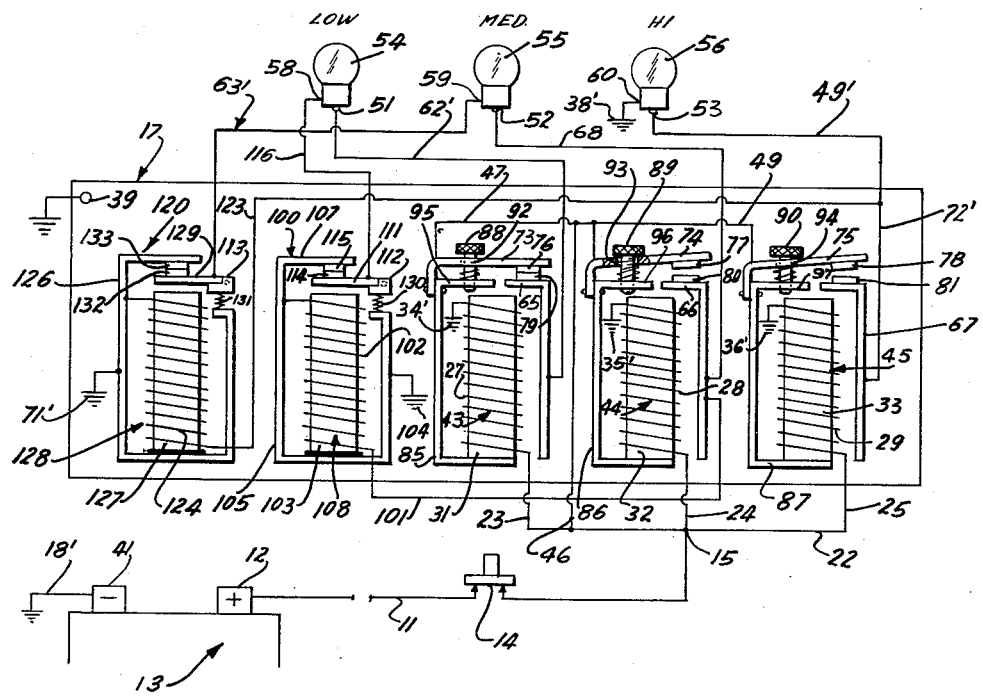
FIG. 4 is a circuit diagram of a modification such as shown in FIG. 1, with the addition of two units of electrical elements, one unit hooked up to cut out the low range indicator circuit, and the other to cut out the medium range indicator circuit.
Figure 5:
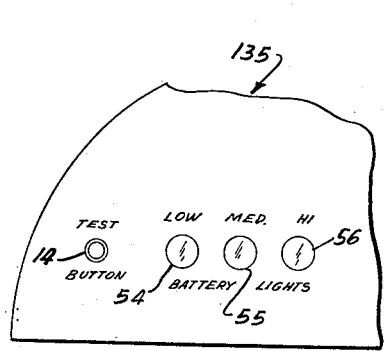
FIG. 5 is a fragmentary view of a dashboard showing a push button switch and voltage range indicator lights mounted on it.

Similarly, the corresponding parts in FIG. 4 (except for replacing return leads 34, 35 and 36 by ground connections 34', 35' and 36') constitute the same switch operating branch of the corresponding respective low, medium, and high voltage indicating circuits.

Each assembly of a core with a coil wound about it constitutes an electromagnet when electricity flows through its respective coil. Thus, core 31 surrounded by coil 27 makes available electromagnet 43. Similarly, core 32 with its coil 28 give electromagnet 44, and core 33 with its coil 29 yield electromagnet 45.

From input terminal 15, a second positive extension conductor 46, within the device, is connected through take-off leads 47, 48, and 49 to bases 51, 52 and 53 respectively of the sockets holding small wattage electric light bulbs or lamps 54, 55, and 56. The sleeves 58, 59, and 60 of the sockets are linked by connecting conductors 62, 63, and 64 to fixed bases 65, 66, and 67 respectively of the magnetically closable switches, as seen in FIG. 1.

From a second negative extension 69, extending within the device from output terminal 39, return leads 70, 71, and 72 connect with magnetically attractable and resilient switch-closing arms 73, 74, and 75 respectively. Each such arm is fixedly supported at one end (its right end as in FIG. 1; its left as in FIG. 4). It then extends cantilever-wise across and spaced away from the upper (or otherwise, the outer) end of its respective cores 31, 32, and 33 for its own outer (or free) or contact end or points 76, 77, and 78 to overlap, also in spaced away relationship, contact points 79, 80, and 81 respectively of the fixed bases 65, 66, and 67 of the magnetically closable switches. Thus, these magnetically attractable arms 73, 74, and 75 are in essence the armatures of the electromagets 43, 44, and 45 respectively.

The respective distances between the near ends of cores 31, 32, and 33 and the armatures 73, 74, and 75 are so adjusted that these arms are attracted to their respective cores to close the gaps between each of the three pairs of contact points 76 and 79, 77 and 80, and 78 and 81 when (as to FIG. 1) each of the electromagnets 43, 44, and 45 is energized by the current that flows through their coils when clamps 19 and 20 are attached to the respective terminals of a battery whose voltage strength is in the high portion of its range, and to close the gaps only between points 76 and 79, and 77 and 80 when the voltage strength of the battery being tested is in the medium portion of its range, and to close the gap only between the contact points 76 and 79 when the voltage strength of the battery being tested is in the low portion of its range.

Accordingly, the gap between the contacts 76 and 79 is the smallest of the gaps between the contact points in the three pairs of them; the gap between the points 78 and 81 is the largest of the three; and the gap between the contacts 77 and 80 is intermediate that between the contacts in the other two pairs.

The device can be constructed with the parts involved, namely, the respective core, armature, and switch base, in such position relationship to one another to provide the proper gap between the members of each pair of contact points. However, it is advantageous also to include an adjusting screw (to be described below in relation to FIG. 4) for each armature to permit adjustment of the respective gaps.

Referring for the most part to FIGURE 1, take-off lead 47, socket 51—58, light bulb 54, connecting conductor 62, switch base 65, contact points 79 and 76, armature 73, and return lead 70 constitute the voltage strength indicating branch of the low voltage indicating circuit. Correspondingly, take-off lead 48, lamp socket 52—59, light bulb 55, conductor 63, switch base 66, contact points 80 and 77, armature 74, and return lead 71 constitute the voltage strength indicating branch of the medium voltage indicating circuit. Similarly, take-off lead 49, lamp socket 53—60, lamp 56, conductor 64, switch base 67, contact points 81 and 78, armature 75, and return lead 72 make up the voltage strength indicating branch of the high voltage indicating circuit.

In the modification of FIG. 4 the fixed end of each of the armatures 73, 74, and 75 is rigidly attached to the upper end of a separate one of the electrical non-conductor supports 85, 86 and 87 respectively. Instead of being a non-conductor, each of these supports can be insulated from any parts of the device that is part of an electric circuit.

The size of the gaps between the contact points in the low, medium, and high voltage indicating circuits are adjusted by sufficient turning of hand-screws 88, 89, and 90, preferably knurl-headed, passed through corresponding slots 92, 93, and 94 respectively, in armatures 73, 74, and 75 and anchored in threaded engagement in threaded apertures in the screw-anchoring lugs 95, 96, and 97. These lugs project from supports 85, 86, and 87 part of the way under, and parallel to, the armatures, the slots in which allow free play.

The hand-screw is turned to move down with the under side of its head pushing against the outer or upper side of the armature till the gap between the contact points is of the proper size for the voltage range of the particular circuit. In place of this particular means for adjusting the gap size between any pair of contact points, there can be used any of the other types of such means for adjusting the distance between such electromagnet core and its armature. Thus, there can be used the hand-screw arrangement commonly found for such adjustment in the armature supported door-bell knocker (which hand-screw type is used in FIG. 1), or the one found in the ordinary automobile voltage regulator.

As shown in FIG. 1, for the voltage indicator circuit for the high range, there the knurl-headed hand-screw 90' is held in threaded engagement in the non-conductor, or insulated, lug 97' and pushes against armature 75 which is pulled against the tip of screw 90' by spring 98 anchored on insulated pin 99. Hand-screw 90' is turned one way or the other till the required gap size is set. Similar contact point gap adjustment means are provided for use on each of the other two armatures 74 and 73.

Such means for adjusting the size of the gap between the contact points of any pair of them can be omitted entirely by particular selection of the specifications, e.g. coil wire diameter for the electromagnet, etc. However, the presence of the adjustment means can be an advantage, for example, for adjustment of the device to service batteries of various types or loads, such as six volt or twelve or twenty-four volt batteries.

Figure 3:
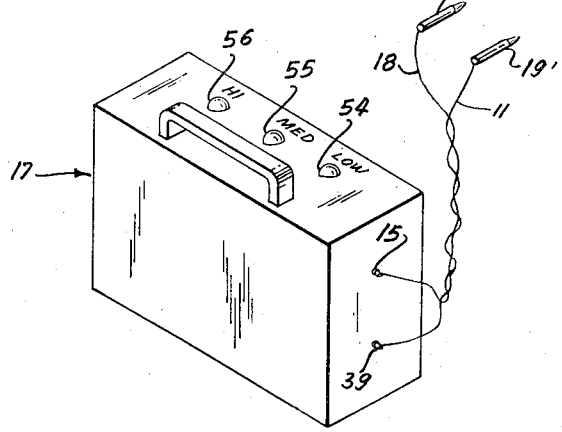
FIG. 3 shows a perspective of a portable model that can have the circuit of either FIGURE 1 or 4.

Either of the modifications of FIGURES 1 and 4 can be enclosed in a suitable housing to provide a portable tester device as shown in FIG. 3. In it with the modification of FIG. 1, the low lamp 54 will light when a battery is in its low voltage range; both the low lamp and the medium lamp 55 will light when a battery is in its medium voltage range; and all three lamps will light when a battery is in its high voltage range.

However, with the modification of FIG. 4 only the single specific lamp corresponding to the specific voltage range will light even when a battery is in its medium or high voltage range. The modifications of FIGURES 1 and 4 are for the most part alike in their fundamental circuits for determining the particular voltage range for any battery tested. However, the difference in the modification of FIG. 4 that enables it to show only a single lamp lit at each one of the different voltage ranges results from its having in addition specific means for breaking the low lamp circuit when a battery voltage is in the medium range, and additional like means to break also the medium lamp circuit when a battery voltage is in the high range.

FIG. 4 shows the relationship of the various parts of its several circuits when a battery with voltage in the low range is on test. Thus, the gap between contacts 76 and 79 is closed completing the circuit in the low voltage indicating branch so that low voltage lamp 54 is lit.

While this indicating branch circuit includes all of the various elements of the related same indicating branch circuit of the modification seen in FIG. 1 and for the most part in practically similar sequence, this low voltage indicating branch circuit of the FIG. 4 modification includes in addition a relay identified as a whole by reference numeral 100. Relay 100 is the means that breaks this indicating branch circuit thereby to turn off lamp 54 when a battery whose voltage is in the medium range is being tested.

From fixed base 66 of the closable switch in the voltage indicating branch of medium voltage strength indicating circuit, low-breaker-conductor 101 connects with the input end of coil 102 wound about core 103 of relay 100. The output end of coil 102 is connected to ground 104 through electrical conducting support 105 for fixed base 107 for the contactor of relay 100.

Core 103 and its coil 102 constitute electromagnet 108 which operates when energized by current flowing through its coil from low-breaker-conductor 101. Lead 116 connects sleeve 58 of the socket of low indicating lamp 54 with armature 111 of electromagnet 108, resiliently supported in cantilever-like form from insulated or non-conductor post 112. When not in use, and when testing a battery with voltage in the low range, contact point 114 of armature 111 directly contacts contact point 115 of fixed base 107. Core 103 is insulated from conducting support 105.

Thus, the voltage indicating branch of the low voltage indicating circuit (in FIG. 4) is energized from input terminal 15, from which a second positive extension conductor 46 connects through take-off lead 47 to armature 73. Its contact point 76 contacts contact point 79 of fixed base 65 of the closable switch linked through connecting conductor 62' to base 51 of the socket holding (low indicating) lamp 54. Lead 116 connects sleeve 58 of the socket for lamp 54 with armature 111.

When a battery having its voltage strength in the medium range is tested with the modification of FIG. 4, current entering at positive terminal 15 flows through take-off lead 24 and coil 28 thereby energizing electromagnet 44 to attract armature 74 and pull it down until its contact point 77 meets contact point 80 of fixed base 66.

This completes the circuit so that current flows from fixed base 66 through conductor 68 to base 52 of the socket holding medium indicator lamp 55. The current then leaves from sleeve 59 through conductor 63' to closed relay 120 and through it to ground 71', thereby completing the circuit so that lamp 55 lights up.

At the same time current from fixed base 66 flows through low-breaker-conductor 101 to energize electromagnet 108 and thereby break the contact between contact points 114 and 115. This breaks the circuit including low indicating lamp 54 which then cannot light up even though electromagnet 43 was energized to bring contact points 76 and 79 together. Thus, only medium light 55 is on.

When the device of FIG. 4 is used to test a battery whose voltage strength is in the high range, closing switch 14 lets current flow past terminal 15 along conductor 22 and take-off lead 25 through coil 29 thereby energizing magnet 45 to pull down armature 75 and bring its contact point 78 down to contact contact point 81.

At the same time current flows along conductor 22 to take-off leads 23 and 24 and into the respective coils of electromagnets 43 and 44 to energize them simultaneously to attract armatures 73 and 74 to close the gap between the pair of contact points 76 and 79 and between the pair of points 77 and 80, respectively.

However, the low and medium lamps 54 and 55 do not light up because their circuits are broken by the operation of relay 100 in the manner already described, and operation of relay 120 in similar manner.

For the operation of relay 120, current from the battery passes through terminal 15 and along conductor 46 to take-off lead 49, through armature 75 and the contact points 78 and 81 in contact with one another, and through fixed base 67.

From this base, current flows through return lead 72' to medium-breaker-conductor 123 to coil 124 of relay 120 and through its fixed base 126 to ground 71'.

Coil 124 wound around core 127 makes electromagnet 128 of relay 120. Energized by the current, electromagnet 128 attracts armature 129 resiliently projecting in cantilever-like form from insulated or non-conductor post 113. Thereby contact points 132 and 133 are pulled apart and break the circuit including conductor 63' so that medium indicator lamp 55 cannot light up. At the same time current also runs from return lead 72' through conductor 49' to base 53 of the socket bearing high voltage indicator lamp 56. From sleeve 60 of that socket, the current flows to ground 38' to complete the indicator lighting circuit. Thus, lamp 56 lights up and is the only light showing.

Relays 100 and 120 need not include means for adjusting any position of armatures 111 and 129. This is so because when the testing device is idle or is used to test a battery with its voltage in the low range, the normal position of armatures 111 and 129 is such that both the pair of contact points 114 and 115 and the pair of contact points 132 and 133 are in closed contacting position. This condition is readily maintained, for example, by making armatures 111 and 129 of a good grade of spring steel and so positioned normally to keep their respective pairs of contact points in closed contact. In that way, after either or both of electromagnets 108 and 128 is energized, there is broken the corresponding circuit that includes the armature of the energized electromagnet, or both circuits, if both electromagnets were energized. However, each circuit so opened is immediately closed again when the corresponding one, or both, of electromagnets 108 and 128 is, or are, de-energized, as the case may be. Springs 130 and 131 can serve to close armatures 111 and 129.

Figure 6:
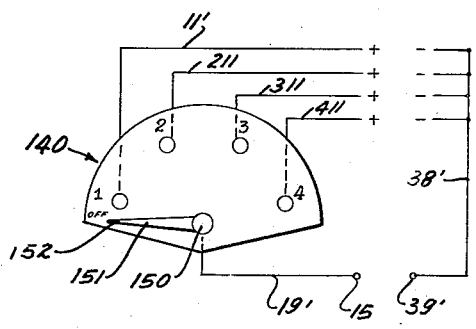
FIG. 6 shows a fragmentary circuit diagram having a selector switch interposed between the testing device and a plurality of batteries.

The modification of the testing device of the invention shown in either of FIGURES 1 and 4 can be affixed to a conveniently suitable location on any of the types of the indicated equipment having batteries to be tested. For example, it can be so affixed on an automobile or motor-boat or launch or aeroplane, and the like. In such use, both the starting switch, such as the push-button 14, and the voltage strength indicator lamps 54, 55, and 56 can be mounted in a location convenient to the operator on the dashboard 135.

Where the testing device is thus carried in some automotive vehicle, or other equipment, that uses more than one battery at a time, the starting switch 14 is replaced by the selector switch 140 (see FIGURE 6).

In using it, the positive terminal of the first of the several batteries is connected through conductor 11' to contact 1 of the selector switch. Similarly, the positive terminal of a second battery is connected through conductor 211 to contact 2 on that switch. A third battery is similarly connected through conductor 311 to contact 3, and a fourth battery through conductor 411 to contact 4, and so on.

Conductor 19' connects pivot junction 150 for selector arm 151 to the input terminal of the tester. The negative terminals are all connected in parallel to a single negative extension 38' which connects with negative terminal 39' of the device. Then to test any one of the several batteries one need only to turn selector arm 151 to position its outer or contact end 152 in contact with the contact bearing the number for the particular battery to be tested. The result on each such test is indicated by the lighting up on dashboard 135 of the particular lamp 54, 55 or 56 for the voltage range of the respective battery so tested.

While the invention has been explained by detailed description of certain specific embodiments of it, it is understod that various modifications and substitutions can be made in any of the various parts of these illustrative embodiments, within the scope of the appended claims which are intended also to cover equivalents of the various specific embodiments.

What is claimed is:

1. A device for showing directly the general level of the voltage strength of a battery, which device comprises a positive conductor for electrical connection with the positive terminal of a battery, a negative conductor for electrical connection with its negative terminal; a high voltage range strength indicating circuit having two branches connected in parallel directly between the positive conductor and the negative conductor, one branch being the high voltage strength indicating branch and having in electrical series connection an electrically operable high voltage range indicator and a closable switch which when closed allows current to flow through the branch, the second branch being the switch operating branch and having directly connected between said positive and negative conductors means operable to close the switch in the first branch and capable of so operating only when there flows through the second branch only that current which can flow through it when the voltage of the battery is in the high part of its range; and at least one other such circuit also having two such branches connected in parallel directly between said two conductors, but with the voltage range indicator in its first branch being the low voltage range indicator, and with its second branch being operable to close the switch in its first branch when the current flowing through its second branch is that current which can flow through it when the voltage of the battery is in the low part of its range; the switch-operating branches of said voltage strength indicating circuits constituting a substantially constant impedance across said positive and negative conductors, whereby the current flow through said switch-operating branches is determined primarily by the strength of a battery connected to said positive and negative conductors.

2. A device as claimed in claim 1, wherein the switch in the first branch of at least the low voltage range indicating circuit has a magnetically attractable member movable to close that switch, and a magnetizable core is associated with the second branch of that circuit in such spaced relationship wherein the second branch is wound about the core whereby together they form an electromagent, and the core is so positioned relative to the magnetically attractable member so as to attract that member to it when the voltage of the battery is in the low portion of its range; and then the means in the second branch of the high voltage range indicating circuit operable to close the switch in its first branch is so positioned relative to the switch to leave it open but also to close it when the voltage of the battery is in the high portion of its range.

3. A device as claimed in claim 2, wherein the first branch of the high voltage range indicating circuit also has a magnetically attractable member movable to close its switch, and a magnetizable core also is associated with the second branch of that circuit also in such spaced relationship to have that branch wound about the core to form with it an electromagnet.

4. A device as claimed in claim 3, wherein for each magnetically attractable member movable to close its respective switch there is provided for contact with said attractable member hand-operable and electrically insulated means that enable adjusting the spaced relationship between said attractable member and its respective core.

5. A device as claimed in claim 3, wherein the magnetically attractable member is fixed at one end and functions as an armature in relation to the electromagnet, and on being attracted by the core serves directly in closing the circuit in the switch.

6. A device as claimed in claim 1, wherein the electrically operable voltage range indicator in the first branch of each voltage range indicator circuit is an electric light bulb in a socket for it.

7. A device as claimed in claim 6, wherein the electrical conducting character of the positive conductor is interrupted by a push button switch interposed intermediate its length, and the device is mounted in a portable housing with the electric light bulbs so positioned as to be viewed from the outside of the housing, and the push button switch so mounted as to be operable on the outside of the housing, and both the positive and negative conductors extend outside the housing with each of them terminating in an exposed contact end to provide electrical conducting contact with the respective terminals of a battery to be tested and being long enough to be able to reach those terminals.

8. A device as claimed in claim 1, wherein there is a third such circuit also having two such branches connected in parallel between the two conductors, but with the voltage range indicator in its first branch being the medium voltage range indicator, and with its second branch being operable to close the switch in its first branch when the current flowing through its second branch is the current that can flow through it when the voltage of the battery is in the medium part of its range, the switch-operating branch of said third circuit presenting an impedance across said positive and negative conductors in parallel with the parallel impedance of the switch-operating branches of said first and second voltage strength indicating circuits.

9. A device for showing directly the general level of the voltage strength of a battery, which device comprises a positive conductor for electrical connection with the positive terminal of a battery, a negative conductor for electrical connection with its negative terminal; a high voltage range strength indicating circuit having two branches connected in parallel between the positive conductor and the negative conductor, one branch being the high voltage strength indicating branch and having in electrical series connection an electrically operable high voltage range indicator and a closable switch which when closed allows current to flow through the branch, the second branch being the switch operating branch and having means operable to close the switch in the first branch and capable of so operating only when there flows through the second branch only that current which can flow through it when the voltage of the battery is in the high part of its range; and at least one other such circuit also having two such branches connected in parallel between the two conductors, but with the voltage range indicator in its first branch being the low voltage range indicator, and with its second branch being operable to close the switch in its first branch when the current flowing through its second branch is that current which can flow through it when the voltage of the battery is in the low part of its range; and for each respective voltage range strength indicating circuit, other than that for the high voltage range, means to open the switch in its respective voltage strength indicating branch when the battery voltage is in a range higher than that of its own respective individual range.

10. A device as claimed in claim 9, wherein the means to open the switch in the first branch of the low voltage strength indicating circuit is a second and normally closed switch in series connection with the first mentioned switch, and which second switch is opened by the operation of switch-opening means energized by current flowing in a conductor shunted from the first branch of the medium voltage strength indicating circuit; and the means to open the switch in the first branch of the medium voltage strength indicating circuit is a second and normally closed switch in series connection with the just prior mentioned switch, and which second switch is opened by the operation of switch-opening means energized by current flowing in a conductor shunted from the first branch of the high voltage strength indicating circuit.

11. A device as claimed in claim 10, wherein the switch-opening means is an electromagnet comprising a magnetizing coil wound about a magnetizable core and which coil is in series with and energized by the current flowing from the first branch of the respective next higher voltage strength indicating circuit, and the switch-opening arm of the normally closed switch that is to be opened serves as the armature of the electromagnet.

12. A device as claimed in claim 11, wherein the electrically operable voltage range indicator in the first branch of each range indicator circuit is an electric light bulb in a socket for it.

13. A device as claimed in claim 12, wherein the electrical conducting character of the positive conductor is interrupted by a push button switch interposed intermediate its length, and the device is mounted in a portable housing with the electric light bulbs so positioned as to be viewed from the outside of the housing, and the push button switch so mounted as to be operable on the outside of the housing, and both the positive and negative conductors extend outside of the housing with each of them terminating in an exposed contact end to provide electrical conducting contact with the respective terminals of a battery to be tested and being long enough to be able to reach those terminals.

14. A combination employing at least one electrical battery as a source of electrical current and having an indicator board, which combination comprises a device, as claimed in claim 12, for showing directly the general level of the voltage strength of a battery, and wherein the electrical conducting continuity of the positive conductor is interrupted by a manually operated switch interposedly connected in it intermediate its length, which switch is mounted in the combination at a location convenient to the reach of the operator; and in which device the electrically operable voltage range indicator in the first branch of each voltage range indicator circuit is an electric light bulb mounted in electrical contact in a socket for it, which sockets are so mounted with respect to the indicator board that these light bulbs are readily viewable in a location on it convenient for the operator.

15. A combination as claimed in claim 14 incorporated in an automotive vehicle and wherein the indicator board is in essence what is commonly referred as the dashboard of an automobile, and the manually operated switch in a push button switch and it is mounted on the indicator board in a location convenient for the operator, and the light bulb sockets are so mounted with respect to the indicator board that these light bulbs are viewable in a location on it convenient for the operator.

16. A combination as claimed in claim 14 and having more than one battery, wherein the manually operated switch is a selector switch having a selector arm and selectable contacts individually selectively contactable by a part of the selector arm, and the part of the positive conductor between the voltage strength showing device and the selector switch is connected to the selector arm and a separate continuing positive conductor length extends independently respectively from each of the selectable contacts to a different one of the batteries.

References Cited in the file of this patent

UNITED STATES PATENTS

| | | |
|---|---|---|
| 1,897,610 | Drake | Feb. 14, 1933 |
| 2,096,131 | Oestermeyer | Oct. 19, 1937 |
| 2,179,962 | Scott | Nov. 14, 1939 |
| 2,229,009 | Berry | Jan. 14, 1941 |
| 2,347,523 | Suksdorf | Apr. 25, 1944 |